United States Patent
Kobayashi et al.

(10) Patent No.: US 6,280,006 B1
(45) Date of Patent: Aug. 28, 2001

(54) BRAKE HYDRAULIC CONTROL DEVICE FOR USE IN VEHICLE

(75) Inventors: Masashi Kobayashi; Ryouji Yamazaki, both of Nagano (JP)

(73) Assignee: Nissin Kogyo Co., Ltd., Nagano-Ken (JP)

(*) Notice: Subject to any disclaimer, the term of this patent is extended or adjusted under 35 U.S.C. 154(b) by 0 days.

(21) Appl. No.: 09/357,662

(22) Filed: Jul. 20, 1999

(30) Foreign Application Priority Data

Jul. 31, 1998 (JP) .................................................. 10-217007

(51) Int. Cl.[7] ....................................................... B60T 8/24
(52) U.S. Cl. ........................... 303/139; 303/10; 303/116.1
(58) Field of Search .................. 303/139, 10, 11, 303/DIG. 10, DIG. 11, 116.1, 116.2, 116.3, 116.4

(56) References Cited

U.S. PATENT DOCUMENTS

| | | | | |
|---|---|---|---|---|
| 5,752,749 | * | 5/1998 | Lee | 303/116.1 X |
| 5,984,430 | * | 11/1999 | Koga et al. | 303/116.1 |
| 5,988,767 | * | 11/1999 | Inoue et al. | 303/116.4 X |
| 6,027,182 | * | 2/2000 | Nakanishi et al. | 303/116.1 |
| 6,132,013 | * | 10/2000 | Ganzel | 303/139 |

FOREIGN PATENT DOCUMENTS 9-221015  8/1997 (JP) .

* cited by examiner

Primary Examiner—Robert J. Oberleitner
Assistant Examiner—Melanie Torres
(74) Attorney, Agent, or Firm—McGuireWoods LLP

(57) ABSTRACT

A brake hydraulic control device for use in a vehicle, includes: a master cylinder with a first reservoir attached thereto; a second reservoir different from the first reservoir; a drive wheel control valve unit switching communication and cut-off between a drive wheel brake and the master cylinder as well as communication and cut-off between the drive wheel brake and the second reservoir; a driven wheel control valve unit switching communication and cut-off between a driven wheel brake and the master cylinder as well as communication and cut-off between the driven wheel brake and the second reservoir; and a pump having a discharge port connected between the drive wheel control valve unit and the drive wheel brake, and a suction port connected to the master cylinder through an open/close switch valve and to the said second reservoir.

13 Claims, 8 Drawing Sheets

BRAKE HYDRAULIC CONTROL DEVICE FOR USE IN VEHICLE

BACKGROUND OF THE INVENTION

1. Field of the Invention

The present invention relates to a brake hydraulic control device for use in a vehicle and, in particular, to a brake hydraulic control device for use in a vehicle which is able to control the brake hydraulic pressures of drive and driven wheel brakes respectively by drive wheel control valve means corresponding to the drive wheel brakes and driven wheel control valve means corresponding to the driven wheel brakes, and also which is capable of execution of anti-lock brake control (which is hereinafter referred to as ABS control) and traction control as well as behavior stabilization control in the vehicle take-a-turn operation.

2. Description of the Related Art

Conventionally, a brake pressure control device of the above-mentioned type is already known, for example, from Japanese Patent Unexamined Publication No. 9-221015 of Heisei and the like.

In the brake pressure control device for use in a vehicle that is disclosed in the above-cited Japanese Patent Unexamined Publication No. 9-221015 of Heisei, there are employed a main liquid passage cut-off valve and a bypass cut-off valve. In particular, the main liquid passage cut-off valve is interposed between the drive and driven wheel control valve means and a master cylinder, and the discharge ports of pumps are connected between the main liquid passage cut-off valve and the drive and driven wheel control valve means. The bypass cut-off valve is interposed between the master cylinder and a driven wheel brake, in particular, in a bypass passage which goes around the main liquid passage cut-off valve and driven wheel control valve means.

According to the above structure, while the main liquid passage cut-off valve is opened and the bypass cut-off valve is closed, the brake hydraulic pressures of the drive and driven wheel brakes are controlled by the drive and driven wheel control valve means, to thereby be able to execute the ABS control. And, while the main liquid passage cut-off valve and bypass cut-off valve are both closed, the pumps are operated and the brake hydraulic pressures of the drive wheel brakes are controlled by the drive wheel control valve means, so that the traction control under the non-brake operation condition can be executed. Further, while the main liquid passage cut-off valve and bypass cut-off valve are both closed, the pumps are operated and the brake hydraulic pressures of the drive and driven wheel brakes are controlled by the drive and driven wheel control valve means, so that the behavior stabilization control in the vehicle take-a-turn operation under the non-brake operation condition can be executed.

Also, when the brake operation is executed during execution of the traction control or during the behavior stabilization control in the vehicle take-a-turn operation, the brake pressures of the driven wheel are increased by opening the bypass cut-off valve, to thereby prevent the delayed act or effect of the brakes when such control is terminated, which allows the driver to carry out such braking operation that corresponds to the intention of the driver.

However, in the above-mentioned conventional brake pressure control device, in order to prevent the delayed action or effect of the brake at the time of termination of the control, there are necessary the main liquid passage cut-off valve, the bypass passage which goes around the main liquid passage cut-off valve and driven wheel control valve means and is provided between the master cylinder and a driven wheel brake, and the bypass cut-off valve disposed in the bypass passage. Therefore, the number of parts required in the brake pressure control device is increased and the configuration of a hydraulic circuit is complicated.

SUMMARY OF THE INVENTION

The present invention aims at eliminating the drawbacks found in the above-mentioned conventional brake pressure control device. Accordingly, it is an object of the invention to provide a brake pressure control device for use in a vehicle which, using a hydraulic circuit which requires a reduced number of parts and is simplified in configuration, not only is able to execute the ABS control, traction control, and behavior stabilization control in the vehicle take-a-turn operation, but also, during execution of the traction control and behavior stabilization control in the vehicle take-a-turn operation, is able to prevent the delayed action or effect of the brake, which could otherwise occur as the brake operation is carried out, at the time of termination of the control.

In attaining the above object, according to a first aspect of the invention, there is provided a brake hydraulic control device for use in a vehicle, including: a master cylinder with a first reservoir attached thereto; second reservoirs different from the first reservoir; drive wheel control valve means capable of switching communication and cut-off between drive wheel brakes and the master cylinder as well as communication and cut-off between the drive wheel brakes and second reservoirs; and, driven wheel control valve means capable of switching communication and cut-off between driven wheel brakes and master cylinder as well as communication and cut-off between the driven wheel brakes and second reservoirs, wherein the suction ports of pumps, the discharge ports of which are connected between the drive wheel brakes and drive wheel brakes, are connected to the master cylinder through open/close switch valves and to the second reservoirs.

According to the present structure, in a normal brake operation, with the open/close switch valves closed, communication between the master cylinder and drive and driven wheel brakes is allowed and, at the same time, communication between the drive and driven wheel brakes and second reservoirs is cut off by the drive and driven wheel control valves. Thus, the brake pressure from the master cylinder is applied onto the drive and driven wheel brakes, so that a brake force corresponding to the amount of the brake operation can be obtained.

Also, in the ABS control, the open/close switch valves remain closed. In particular, in the brake hydraulic pressure reduction operation thereof, using the drive or driven wheel control valve means, communication between the master cylinder and drive or driven wheel brakes is cut off and communication between the drive or driven wheel brakes and second reservoirs is allowed, thereby reducing the brake hydraulic pressures of the drive or driven wheel brakes. In the brake hydraulic pressure retention operation thereof, using the drive or driven wheel control valve means, communication not only between the master cylinder and drive or driven wheel brakes but also between the drive or driven wheel brakes and second reservoirs is cut off, thereby retaining the brake hydraulic pressures of the drive or driven wheel brakes. In the brake hydraulic pressure retention operation of the drive wheel brakes, using the drive wheel control valve means, communication not only between the master cylinder and drive wheel brakes but also between the drive wheel brakes and second reservoirs is cut off, and, by actuating the pumps, the brake hydraulic pressure given by the brake fluid drawn from the second reservoirs are applied onto the drive wheel brakes, thereby increasing the brake hydraulic pressures of the drive wheel brakes. Further, in the pressure increase operation of the driven wheel brakes, using the driven wheel control valve means, communication between the master cylinder and driven wheel brakes is allowed and communication between the driven wheel brakes and second reservoirs is cut off, and the brake hydraulic pressure from the master cylinder are applied onto the driven wheel brakes, thereby increasing the brake hydraulic pressures of the driven wheel brakes.

Thus, in the ABS control of the drive wheel brakes, since the pressure reduction, pressure retention and pressure increase of the drive wheel brakes are repeated in this manner, the brake fluid within the second reservoirs is drawn by the pumps to thereby eliminate the possibility that the second reservoirs can be filled with the brake fluid, so that the ABS control of the drive wheel brakes can be executed continuously for a long period of time.

Also, since there is no need for the pumps to discharge the hydraulic pressure that overcomes the output hydraulic pressure of the master cylinder, not only the pumps but also the actuators for driving the pumps can be reduced in size and weight Further, the pumps can be operated only when increasing the hydraulic pressures of the drive wheel brakes, which can reduce the ABS operation noise as well as the power consumption.

On the other hand, under the non-brake operation condition, when executing the traction control and behavior stabilization control in the vehicle take-a-turn operation, while the open/close switch valves are opened, the drive wheel control valve means are used to cut off communication not only between the master cylinder and drive wheel brakes but also between the drive wheel brakes and second reservoirs and, at the same time, the driven wheel control valve means are used to allow communication between the master cylinder and driven wheel brakes but cut off communication between the driven wheel brakes and second reservoirs; and, in this state, the pumps are actuated. Thus, the brake hydraulic pressure given by the brake fluid drawn from the master cylinder, which is now allowed to communicate with the first reservoir because the current condition is the non-brake operation condition, can be applied to the drive wheel brakes to thereby operate the drive wheel brakes, which makes it possible to conduct the traction control and behavior stabilization control in the vehicle take-a-turn operation due to the reduction of the drive forces of the drive wheels.

In this operation, communication and cutoff between the drive wheel brakes and second reservoirs can be switched or controlled by the drive wheel control valve means, to thereby be able to control the brake hydraulic pressures of the drive wheel brakes. And, the brake fluid discharged from the drive wheel brakes is stored in the second reservoirs but, since the brake fluid within the second reservoirs is also drawn by the pumps, there is no fear that the second reservoirs can be filled up with the brake fluid.

Also, there is eliminated the need for provision of special means for executing the traction control and behavior stabilization control and, simply by changing the manner of control of the pumps as well as driven and drive wheel control valve means from the ABS control, the traction control and behavior stabilization control can be executed. Further, in the execution of the traction control and behavior stabilization control, communication between the driven wheel brakes and master cylinder is allowed but communication between the driven wheel brakes and second reservoirs is cutoff. Therefore,when the brake operation is executed during the execution of the traction control and behavior stabilization control, the output hydraulic pressure of the master cylinder involved with the brake operation can be applied immediately onto the driven wheel brakes, and even if the termination of the traction control and behavior stabilization control involved with the brake operation is delayed, the driven wheel brakes are able to obtain the brake forces to thereby prevent the delayed brake action or effect at the time of termination of the control, which allows the driver to execute the braking operation that corresponds to the intention of the driver.

In this manner, according to the present invention, not only the ABS control, traction control, and behavior stabilization control in the vehicle take-a-turn operation are possible, but also the delayed brake effect at the time of termination of the control, which could otherwise occur when the brake operation is executed during execution of the traction control and behavior stabilization control in the vehicle take-a-turn operation, can be prevented. As a structure for realizing this, the open/close switch valves are simply interposed between the suction ports of the pumps and master cylinder. This makes it possible to reduce the number of parts required as well as simplify the configuration of the hydraulic circuit.

Also, in addition to the above structure, between connecting portions, where the drive wheel control valve means and second reservoirs are connected together, and the open/close switch valves, there may be interposed check valves which are respectively used to allow the flow of brake fluid from the connecting portions to the open/close switch valves side. According to the present structure, when executing the behavior stabilization control in the vehicle take-a-turn operation under the brake operation condition, the behavior stabilization control through control of the brake hydraulic pressures of the drive wheel brakes using the drive wheel control valve means can be conducted in such a manner that the check valves prevent the brake hydraulic pressure of the master cylinder from being applied between the second reservoirs and drive wheel control valve means.

Further, according to a second aspect of the invention, there is provided a brake hydraulic control device for use in a vehicle, including: a master cylinder with a first reservoir attached thereto; second reservoirs different from the first reservoir; drive wheel control valve means capable of switching communication and cut-off between the drive wheel brakes and master cylinder as well as communication and cut-off between the drive wheel brakes and second reservoirs; and, driven wheel control valve means capable of switching communication and cut-off between driven wheel brakes and master cylinder as well as communication and cut-off between the driven wheel brakes and second reservoirs, wherein the suction ports of pumps, the discharge ports of which are connected between the drive wheel brakes and drive wheel brakes, are connected to the first reservoir through open/close switch valves and to the second reservoirs.

The present structure is different from the structure of the invention as set forth in the first aspect only in that, when executing the traction control and behavior stabilization control in the vehicle take-a-turn operation under the non-brake operation condition, the open/close switch valves are opened to thereby draw the brake fluid from the first reservoir and the brake hydraulic pressure given by the thus drawn brake fluid is applied to the drive wheels. However, according to this structure, not only there can be obtained similar operations and effects to the structure of the invention as set forth in the first aspect, but also even if the open/close switch valves are opened in the brake operation condition, there is no possibility that the brake hydraulic pressure of the master cylinder can be applied between the second reservoirs and drive wheel control valve means, thereby be able to execute immediately the behavior stabilization control in the vehicle take-a-turn operation under the brake operation condition. Also, since the hydraulic pressure within the master cylinder is not caused to vary even if the open/close switch valves are opened, there is no fear that the opening of the open/close switch valves can have ill influences on the brake operation feeling of the driver.

DETAILED DESCRIPTION OF THE PREFERRED EMBODIMENTS

Now, description will be given below of the preferred embodiments of a brake pressure control device for use in a vehicle according to the invention with reference to the accompanying drawings.

FIGS. 1 to 7 respectively show a first embodiment of a brake pressure control device for use in a vehicle according to the invention.

Figure 1:
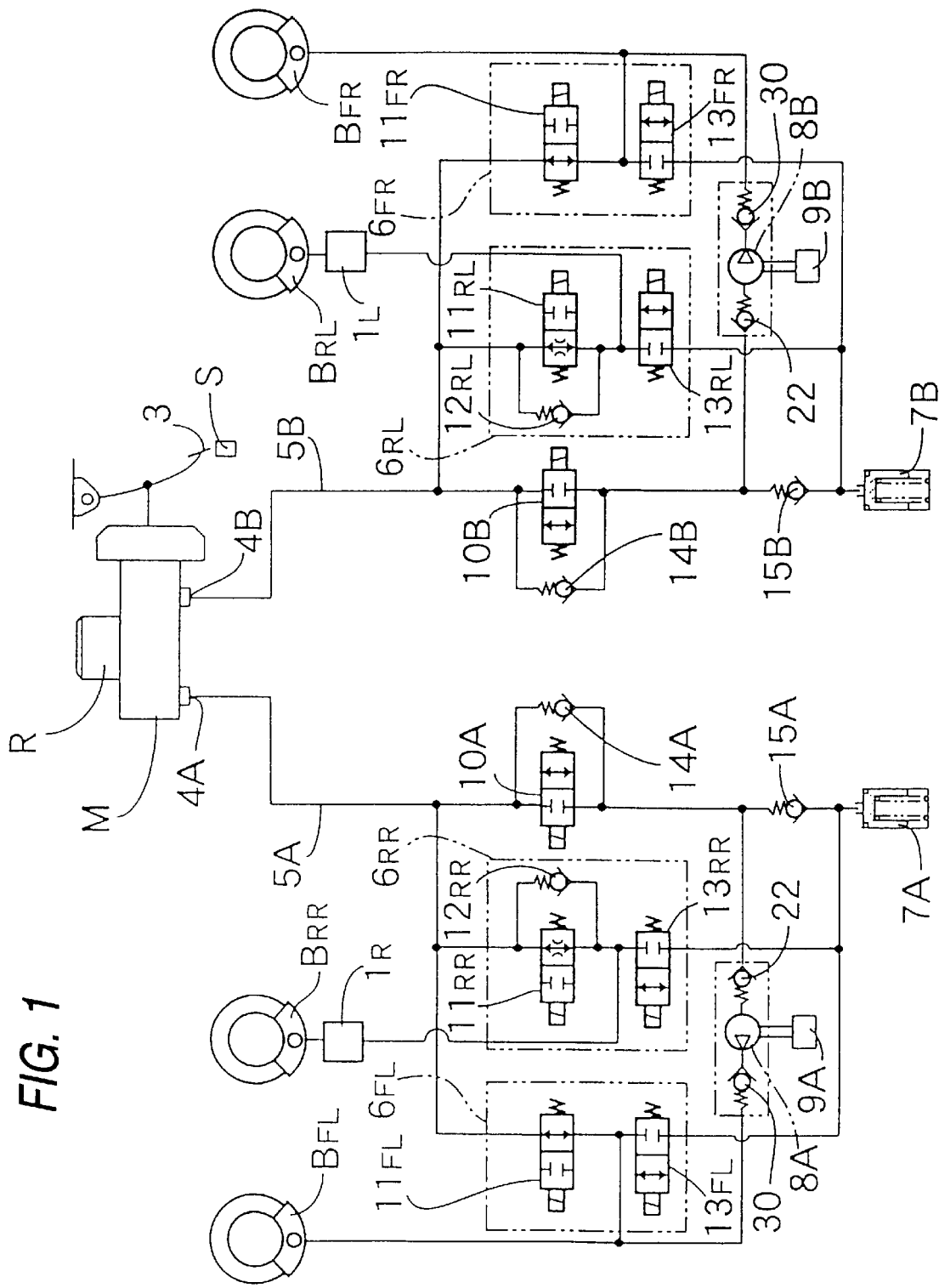
FIG. 1 is a circuit diagram of a hydraulic circuit employed in a brake hydraulic control device for use in a vehicle according to a first embodiment of the invention.

At first, in FIG. 1, the present brake hydraulic control device, which is to be carried on board a four-wheeled vehicle of a front wheel drive type, includes a master cylinder M of a tandem type including a first reservoir R, left and right drive wheel brakes $B_{FL}$, $B_{FR}$ respectively mounted on left and right front wheels which are used as the drive wheels of the vehicle, and left and right driven wheel brakes $B_{RL}$, $B_{RR}$ respectively mounted on left and right rear wheels which are used as the driven wheels of the vehicle. A proportional reducing valve $1_L$ is connected to the left driven wheel brake $B_{RL}$, while a proportional reducing valve $1_R$ is connected to the right driven wheel brake $B_{RR}$.

The master cylinder M includes a pair of output ports 4A and 4B which respectively output brake hydraulic pressures corresponding to the degrees that the brake pedal 3 is pressed down, while output hydraulic passages 5A and 5B are connected to the two output ports 4A and 4B individually. Thus, one output hydraulic passage 5A corresponds to the left drive wheel brake $B_{FL}$ and right driven brake $B_{RR}$ respectively and individually mounted on a set of left front wheel and right rear wheel. The other output hydraulic passage 5B corresponds to the right drive wheel brake $B_{FR}$ and left driven brake $B_{RL}$ respectively and individually mounted on a set of right front wheel and left rear wheel.

A pair of second reservoirs 7A and 7B, which are different from the first reservoir R mounted on the master cylinder M, are disposed in such a manner that they individually correspond to the two output hydraulic passages 5A and 5B. And, drive wheel control valve means $6_{FL}$ is interposed between one output hydraulic passage 5A, second reservoir 7A and left drive wheel brake $B_{FL}$, whereas driven wheel control valve means $6_{RR}$ is interposed between one output hydraulic passage 5A, second reservoir 7A and right driven wheel brake $B_{RR}$. Also, drive wheel control valve means 6, is interposed between the other output hydraulic passage 5B, second reservoir 7B and right drive wheel brake $B_{FR}$, whereas driven wheel control valve means $6_{RL}$ is interposed between the other output hydraulic passage 5B, second reservoir 7B and left driven wheel brake $B_{RL}$.

Between the left drive wheel brake $B_{FL}$ and drive wheel control valve means $6_{FL}$, there is connected a discharge port 18 (see FIG. 2) of a pump 8A in such a manner that it can cut off the flow of the brake fluid from the left drive wheel brake $B_{FL}$ side to the pump 8A side. Between the right drive wheel brake $B_{FR}$ and drive wheel control valve means $6_{FR}$, there is connected a discharge port of a pump 8B in such a manner that it can cut off the flow of the brake fluid from right drive wheel brake BF side to the pump 8B side.

Two actuators 9A and 9B are individually connected to the two pumps 8A and 8B, so that the two pumps 8A and 8B can be operated independently.

The left drive wheel control valve means $6_{FL}$, which corresponds to the left drive wheel brake $B_{FL}$, is composed of a normally open electromagnetic valve $11_{FL}$, which is interposed between the output liquid passage 5A and left drive wheel brake $B_{FL}$, and a normally closed electromagnetic valve $13_{FL}$ interposed between the left drive wheel brake $B_{FL}$ and second reservoir 7A.

The left drive wheel control valve means $6_{FL}$ is controlled in such a manner that it can switch the following states over to one another: that is, a state in which it deenergizes and opens the normally open electromagnetic valve $11_{FL}$ and deenergizes and closes the normally closed electromagnetic valve $13_{FL}$ to thereby allow communication between the master cylinder M and left drive wheel brake $B_{FL}$ and cut off communication between the left drive wheel brake $B_{FL}$ and second reservoir 7A; a state in which it energizes and closes the normally open electromagnetic valve $11_{FL}$ and energizes and opens the normally closed electromagnetic valve $13_{FL}$ to thereby cut off communication between the master cylinder M and left drive wheel brake $B_{FL}$ as well as allow communication between the left drive wheel brake $B_{FL}$ and second reservoir 7A; a state in which it energizes and closes the normally open electromagnetic valve $11_{FL}$ and deenergizes and closes the normally closed electromagnetic valve $13_{FL}$ to thereby cut off communication between the master cylinder M and left drive wheel brake $B_{FL}$ as well as between the left drive wheel brake $B_{FL}$ and second reservoir 7A.

On the other hand, the right drive wheel control valve means $6_{FR}$ corresponding to the right drive wheel brake $B_{FR}$ is composed of a normally open electromagnetic valve $11_{FR}$, which is interposed between the output liquid passage 5B and right drive wheel brake $B_{FR}$, and a normally closed electromagnetic valve $13_{FR}$ interposed between the right drive wheel brake $B_{FR}$ and second reservoir 7B. The right drive wheel control valve means $6_{FR}$ is controlled in such a manner that it can switch the following states over to one another: that is, a state in which it allows communication between the master cylinder M and right drive wheel brake $B_{FR}$ and cuts off communication between the right drive wheel brake $B_{FR}$ and second reservoir 7B; a state in which it cuts off communication between the master cylinder M and right drive wheel brake $B_{FR}$ as well as allows communication between the right drive wheel brake $B_{FR}$ and second reservoir 7B; a state in which it cuts off communication between the master cylinder M and right drive wheel brake $B_{FR}$ as well as between the right drive wheel brake B, and second reservoir 7B.

The driven wheel control valve means $6_{RR}$, which corresponds to the right driven wheel brake $B_{RR}$, is composed of a normally open electromagnetic valve $11_{RR}$ with a throttle interposed between the output hydraulic 5A and right driven wheel brake $B_{RR}$, a one-way valve $12_{RR}$, connected in parallel to the normally open electromagnetic valve $11_{RR}$, and a normally closed electromagnetic valve $13_{RR}$ interposed between the right driven wheel brake $B_{RR}$ and second reservoir 7A; and, the one-way valve $12_{RR}$ is arranged such that, when the brake operation is stopped while the normally open electromagnetic valve $11_{RR}$ is open, it returns quickly the brake fluid from the right driven wheel brake $B_{RR}$ to the master cylinder M side.

The present right drive wheel control valve means $6_{RR}$ is controlled in such a manner that it can switch the following states over to one another: that is, a state in which it deenergizes and opens the normally open electromagnetic valve $11_{RR}$ and deenergizes and closes the normally closed electromagnetic valve $13_{RR}$ to thereby allow communication between the master cylinder M and right drive wheel brake $B_{RR}$ and cut off communication between the right drive wheel brake $B_{RR}$ and second reservoir 7A; a state in which it energizes and closes the normally closed electromagnetic valve $11_{RR}$ and energizes and opens the normally closed electromagnetic valve $13_{RR}$ to thereby cut off communication between the master cylinder M and right drive wheel brake $B_{RR}$ as well as allow communication between the right drive wheel brake $B_{RR}$ and second reservoir 7A; a state in which it energizes and closes the normally open electromagnetic valve $11_{RR}$ and deenergizes and closes the normally closed electromagnetic valve $13_{RR}$ to thereby cut off communication between the master cylinder M and right drive wheel brake $B_{RR}$ as well as between the right drive wheel brake $B_{RR}$ and second reservoir 7A.

Further, the driven wheel control valve means $6_{RL}$, which corresponds to the left driven wheel brake $B_{RL}$, is composed of a normally open electromagnetic valve $11_{RL}$ with a throttle interposed between the output hydraulic 5B and left driven wheel brake $B_{RL}$, a one-way valve $12_{RL}$ connected in parallel to the normally open electromagnetic valve $11_{RR}$, and a normally closed electromagnetic valve $13_{RL}$ interposed between the left driven wheel brake $B_{RL}$ and second reservoir 7B. The right drive wheel control valve means $6_{RL}$ is controlled in such a manner that it can switch the following states over to one another: that is, a state in which it allows communication between the master cylinder M and left driven wheel brake $B_{FL}$ and cuts off communication between the left drive wheel brake $B_{FL}$ and second reservoir 7B; a state in which it cuts off communication between the master cylinder M and left drive wheel brake $B_{FL}$ as well as allows communication between the left driven wheel brake $B_{FL}$ and second reservoir 7B; a state in which it cuts off communication between the master cylinder M and left driven wheel brake $B_{FL}$ as well as between the left driven wheel brake $B_{FL}$ and second reservoir 7B.

A suction port 20 (see FIG. 2) of the pump 8A is connected to one output hydraulic passage 5A through an open/close switch valve 10A, which is a normally closed electromagnetic valve, and a first check valve 14A to be connected in parallel to the open/close switch valve 10A. A suction port of a pump 8B is connected to the other output hydraulic passage 5B through an open/close switch valve 10B, which is a normally closed electromagnetic valve, and a first check valve 14B to be connected in parallel to the open/close switch valve 10B. Thus, the first check valves 14A and 14B respectively allow the flow of the brake fluid to the output hydraulic passages 5A and 5B.

Also, between the open/close switch valve 10A and connecting portions, where the drive and driven wheel control valve means $6_{FL}$, $6_{FR}$ and second reservoir 7A are connected together, there is interposed a second check valve 15A which allows the flow of the brake fluid from the connecting portion to the open/close switch valve 10A side. On the other hand, between the open/close switch valve 10B and connecting portion, where the drive and driven wheel control valve means $6_{FR}$, $6_{RR}$ and second reservoir 7B are connected together, there is interposed a second check valve 15B which allows the flow of the brake fluid from the connecting portion to the open/close switch valve 10B side. Accordingly, the suction ports 20 of the pumps 8A and 8B may be connected between the second reservoirs 7A, 7B and second check valves 15A, 15B, or between the second check valves 15A, 15B and open/close switch valves 10A, 10B; and, in the present embodiment, the suction ports 20 of the pumps 8A and 8B are connected between the second check valves 15A, 15B and open/close switch valves 10A, 10B.

Figure 2:
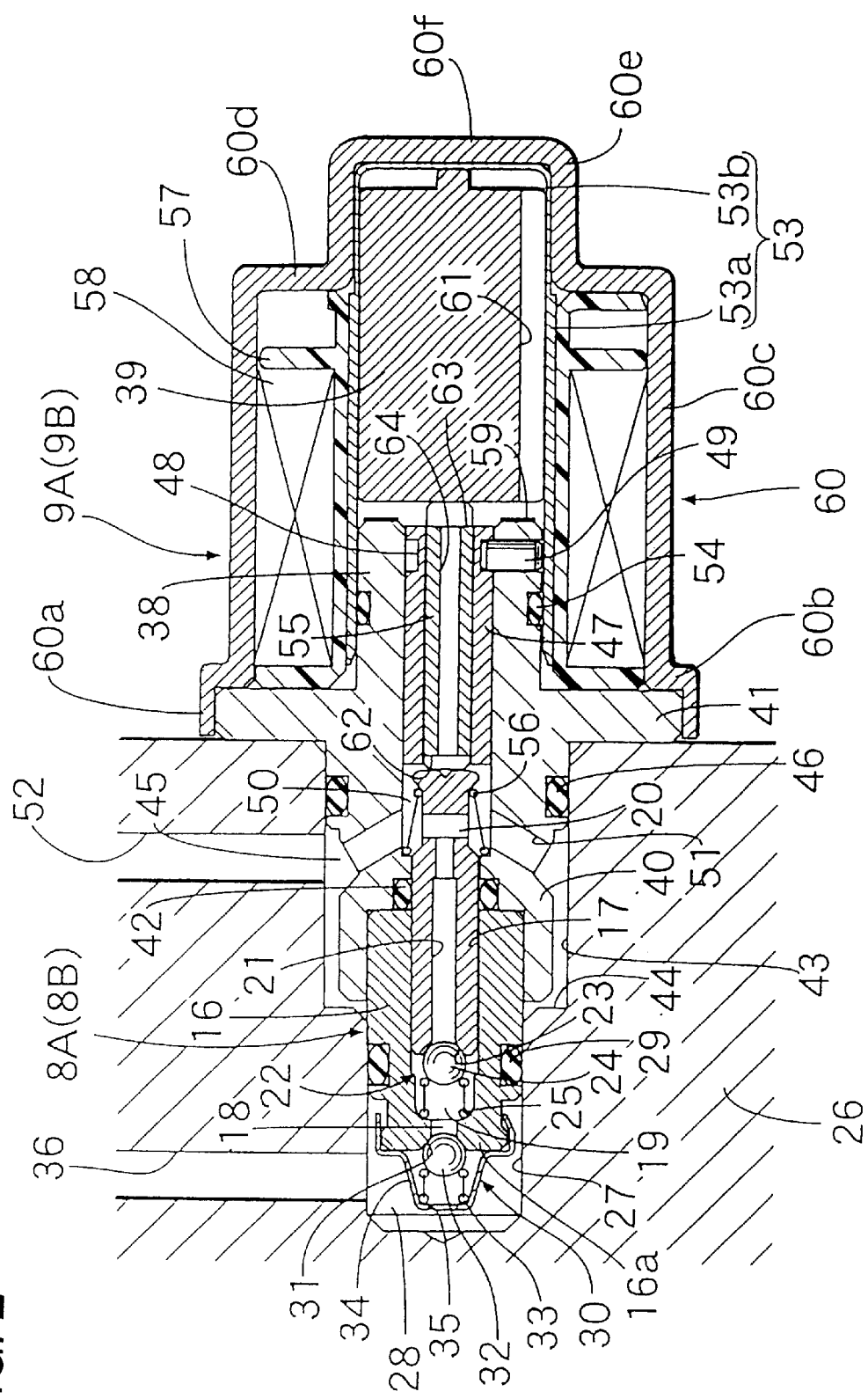
FIG. 2 is a longitudinal section view of pumps and actuators used in the first embodiment.

Next, description will be given below of the structure of the pump 8A and actuator 9A with reference to FIG. 2. Here, the two pumps 8A and 8B are the same in structure and thus the description of the structure of the pump 8B is omitted here; and, the two actuators 9A and 9B are also the same in structure and thus the description of the structure of the actuator 9B is omitted here.

The pump 8A includes a pump housing 16, which is formed in a bottomed cylindrical shape and includes an end wall 16a at one end thereof, and a bar-shaped plunger 17 which can be slidably fitted with the pump housing 16.

In the central portion of the end wall 16a, there is formed the discharge port 18 and, between one end of the plunger 17 and end wall 16a, there is formed a pump chamber 19. Also, the other end of the plunger 17 projects from the other end of the pump housing 16 and, in the other end of the plunger 17, there is formed the suction port 20 which extends along one diameter line of the plunger 17 and the two ends of which are opened on the outer surface of the plunger 17. Further, coaxially with the plunger 17, there is formed a communication passage 21, one end opening portion of which faces a tapered valve seat 23 disposed in the central portion of one end of the plunger 17, while the other end of the communication passage 21 communicates with the suction port 20.

Within the pump chamber 19, there is stored a suction valve 22 which is capable of closing the one end opening portion of the communication passage 21. The suction valve 22 includes the above-mentioned valve seat 23, a spherical-shaped valve body 24 which can be seated on the valve seat 23, and a spring 25 which is interposed between the end wall 16a of the pump housing 16 and valve body 24 and energizes the valve body 24 in a direction where the valve body 24 is seated on the valve seat 23.

The suction valve 22 can be opened as the pressure of the pump chamber 19 is reduced due to the movement of the plunger 17 in a direction (in FIG. 2, in the right direction) where the capacity of the pump chamber 19 increases, thereby being able to draw the brake fluid from the suction port 20 into the pump chamber 19 through the communication passage 21. On the other hand, the suction valve 22 can be closed as the pressure of the pump chamber 19 is increased due to the movement of the plunger 17 in a direction where the capacity of the pump chamber 19 decreases, thereby being able to prevent the brake fluid from flowing into the pump chamber 19 from the communicating passage 21.

By the way, the respective control valve means $6_{FL}$, $6_{RR}$, $6_{FR}$, $6_{RL}$, two second reservoirs 7A, 7B, two open/close switch valves 10A, 10B, two first check valves 14A, 14B and two second check valves 15A, 15B are to be mounted on a base body 26 in common, while the pump 8A is also mounted on the base body 26.

In the base body 26, there is formed a first bottomed fit hole 27 into which the pump housing 16 of the pump 8A can be fitted and fixed; that is, the pump housing 16 is fitted into the first fit hole 27 in such a manner that it forms a discharge liquid chamber 28 between one end portion thereof and the closed end of the first fit hole 27. On the outer periphery of the pump housing 16, there is mounted an annular-shaped seal member 29 which can be elastically contacted with the inner peripheral surface of the first fit hole 27.

Within the discharge liquid chamber 28, a discharge valve 30 is mounted on the pump housing 16. The discharge valve 30 includes a tapered valve seat 31 which is disposed on the discharge liquid chamber 28 side surface of the end wall 16a in such a manner that the discharge port 18 in communication with the pump chamber 19 faces the central portion of the valve seat 31, a spherical-shaped valve body 32 which can be seated on the valve seat 31, and a spring 33 which is interposed between the valve body 32 and a retainer to be mounted on one end of the pump housing 16 and energizes the valve body 32 in a direction where the valve body 32 is seated on the valve seat 31. In the central portion of the retainer 34, there is formed a communication hole 35 which is used to prevent the retainer 34 from dividing the interior portion of the discharge liquid chamber 28.

The discharge valve 30 can be closed as the pressure of the pump chamber 19 is reduced due to the movement of the plunger 17 in a direction where the capacity of the pump chamber 19 increases, thereby preventing the brake fluid flowing from the discharge liquid chamber 28 into the pump chamber 19 through the discharge port 18; and, on the other hand, the discharge valve 30 can be opened as the pressure of the pump chamber 19 is increased due to the movement of the plunger 17 in a direction where the capacity of the pump chamber 19 decreases, thereby discharging the brake fluid from the pump chamber 19 into the discharge liquid chamber 28 through the discharge port 18.

In the base body 26, there is formed a discharge passage 36 in such a manner that one end thereof is in communication with the discharge liquid chamber 28, whereas the other end thereof is connected between the left drive wheel brake $B_{FL}$ and drive wheel control valve means $6_{FL}$. That is, the discharge port 18 of the pump 8A is connected between the left drive wheel brake $B_{FL}$ and drive wheel control valve means $6_{FL}$ in such a manner that the flow of the brake fluid from the left drive wheel brake $B_{FL}$ to the pump 8A side can be prevented by the discharge port 30.

The actuator 9A is a solenoid which includes a fixed core 38 and a movable core 39, while the movable core 39 can be so moved as to approach and part away from the fixed core 38 and is to be coaxially connected to the plunger 17 of the pump 8A.

The fixed core 38 is made of magnetic metal into a cylindrical shape. And, in the actuator 9A, there is further disposed a connecting cylindrical portion 40 in such a manner that the base end portion thereof is formed coaxially and integrally with one end of the fixed core 38; and, the leading end portion of the connecting cylindrical portion 40 is connected to the other end of the pump housing 16 of the pump 8A by press fit, or by staking, or by other similar means. Also, in the actuator 9A, there is still further provided a flange portion 41 which projects outwardly in the diameter direction of the actuator 9A from a joint portion where the fixed core 38 and connecting cylindrical portion 40 are jointed together. The flange portion 41 is formed integrally with the fixed core 38 and connecting cylindrical portion 40.

And, the other end portion of the plunger 17 of the pump 8A projects from the other end of the pump housing 16 and is slidably fitted into the connecting cylindrical portion 40. On the inner surface of the connecting cylindrical portion 40, there is mounted an annular-shaped seal member 42 which can be contacted elastically and slidingly with the outer surface of the other end portion of the plunger 17.

By the way, in the base body 26, a second fit hole 43, which is larger in diameter than the first fit hole 27 into which the pump housing 16 fitted, is formed coaxially with the first fit hole 27 in such a manner that an annular-shaped stepped portion 44 is formed between the two fit holes 27 and 43. The outer end of the second fit hole 43 is opened on the outer surface of the base body 26. Accordingly, the connecting cylindrical portion 40 is fitted into the second fit hole 43 and the flange portion 41 is fastened to the outer surface of the base body 26; between "the leading end portion of the connecting cylindrical portion 40 and the other end portion of the pump housing 16" and "the inner peripheral surface of the second fit hole 43 and stepped portion 44", there is formed an annular-shaped chamber 45; and, on the outer surface of the connecting cylindrical portion 40 that is situated nearer to the flange portion 41, there is mounted an annular-shaped seal member 46 which can be elastically contacted with the inner surface of the second fit hole 43.

And, with the fixed core 38 and connecting cylindrical portion 40, there is fitted a guide member 47 which is made of magnetic metal into a cylindrical shape. And, a pin 49, which is structured such that the inner end thereof can be fitted into an annular-shaped groove 48 formed on the outer periphery of the guide member 47 to thereby be able to determine the position of the guide member 47 in the axial direction thereof, is fitted with the fixed core 38 in such a manner that it has an axis extending along the radial direction of the guide member 47. Thus, between "one end of the guide member 47 with the axial position thereof within the fixed core 38 and connecting cylindrical portion 40 determined" and "the other end portion of the plunger 17 and the leading end portion of the connecting cylindrical portion 40", there is formed a suction liquid chamber 50 which is in communication with the suction portion 20 formed in the plunger 17, while the other end position of the guide member 47 is arranged in such a manner that the other end of the guide member 47 can be kept from projecting from the fixed core 38 to the movable core 39 side. Also, in the present structure, in a state where the pin 49 is fitted with the fixed core 38, there is no possibility that the outer end of the pin 49 can project from the outer surface of the fixed core 38.

In the connecting cylindrical portion 40, there are formed a plurality of communication passages 51, - - - which allow the annular-shaped chamber 45 to communicate with the suction liquid chamber 50 and, in the base body 26, there is formed a suction passage 52 one end of which is in communication with the annular-shaped chamber 45, while the other end of the suction passage 52 is connected through the second check valve 15A to the second reservoir 7A. That is, the suction port 20 of the pump 7A is allowed to communicate with the second reservoir 7A through the second check valve 15A.

The fixed core 38 is pressed into a guide cylinder 53. The guide cylinder 53 is composed of a cylindrical portion 53a into one end side of which the fixed core 53 can be fitted, and a bottomed cylindrical portion 53b which is formed coaxially and continuously with the cylindrical portion 53a; and, although the bottomed cylindrical portion 53b is formed larger in thickness than the cylindrical portion 53a, the cylindrical portion 53a and bottomed cylindrical portion 53b are formed integrally with each other in such a manner that the respective inner surfaces thereof are flush with each other. Also, on the outer periphery of the fixed core 38, there is mounted an annular-shaped seal member 54 which can be elastically contacted with the inner surface of the cylindrical portion 53a of the guide cylinder 53.

The movable core 39 is slidably fitted into the guide cylinder 53 in such a manner that it is opposed to the fixed core 38. With one end of the movable core 39, there is connected the other end of a rod 55 which is formed of non-magnetic material and one end of which is coaxially contacted with the other end of the plunger 17 of the pump 8A, while the rod 55 is slidably fitted with guide member 47. Also, in the interior portion of the suction liquid chamber 50, in particular, between the plunger 17 and connecting cylindrical portion 40, there is interposed a spring 56 which exerts a spring force acting in a direction to bring the plunger 17 into contact with the rod 55. The spring force of the spring 56 acts on the movable core 39 through the rod 55 and thus the movable core 39 is energized by the spring force of the spring 56 in a direction to move apart from the fixed core 38. By the way, while the spring force of the spring 25 of the suction valve 22 also acts on the plunger 17 in a direction to bring the plunger 17 into contact with the rod 55, the spring load of the spring 25 is set smaller than the spring load of the spring 56.

Between the movable and fixed cores 39 and 38, there is interposed a spacer 59 formed of non-magnetic material in such a manner that it is sufficiently spaced apart from the movable core 39 separated away from the fixed core 38. The reason why the spacer 59 is provided and spaced in this manner is to avoid the possibility that the separating motion of the movable core 39 from the fixed core 38 can be interfered due to the residual magnet that is produced when the movable core 39 is contacted directly with the fixed core 38.

The cylindrical portion 53a of the guide cylinder 53 is coaxially enclosed by a bobbin 57 formed of synthetic resin, and a coil 58 is wound around the bobbin 57.

Also, the bobbin 57, coil 58, and, the projecting portion of the guide cylinder 53 that projects from the bobbin 57, are covered by a yoke 60 formed of magnetic metal, while the yoke 60 is connected to the flange portion 41.

The yoke 60 is formed, for example, in a stepped and bottomed cylindrical shape. In particular, the yoke 60 comprises a first cylindrical portion 60a one end of which is opposed to the outer surface of the base body 26 and also into which the flange portion 41 can be fitted, a first annular-shaped step portion 60b which projects from the other end of the first cylindrical portion 60a inwardly in the radial direction of the yoke 60 while it extends in contact with the outer peripheral edge portion of the flange portion 41, a second cylindrical portion 60c which encloses the bobbin 57 and coil 58 coaxially and also one end of which coaxially continues with the inner peripheral portion of the first annular-shaped step portion 60b, a second annular-shaped step portion 60d which projects from the other end of the second cylindrical portion 60c inwardly in the radial direction of the yoke 60 and encloses the bobbin 57 between the flange 41 and itself, a third cylindrical portion 60e one end of which coaxially continues with the inner peripheral portion of the second annular-shaped step portion 60d and also which encloses coaxially the projecting portion of the guide cylinder 53 that projects from the bobbin 57, and an end plate portion 60F for closing the other end of the third cylindrical portion 60e; and, the first cylindrical portion 60a and flange portion 41 are connected to each other by staking or by other similar means.

In the above-structured actuator 9A, while the coil 58 is deenergized, the movable core 39 is situated at a position (a position shown in FIG. 2) where the movable core 58 is separated apart from the fixed core 38 due to the spring force of the spring 56, while the plunger 17 of the pump 8A is moved to a position where the volume of the pump chamber 19 is increased. On the other hand, if the coil 58 is energized, then the movable core 39 is caused to move in a direction to approach the fixed core 38 against the spring force of the spring 56, while the plunger 17 of the pump 8A is moved to a position where the volume of the pump chamber 19 is decreased. That is, by switching the coil 58 between the deenergized and energized states thereof, the movable core 39 is reciprocated in the axial direction thereof and, with the reciprocating motion of the movable core 39, the plunger 17 of the pump 8A is reciprocated in the axial direction thereof, thereby being able to put the pump 8A into operation.

By the way, if a space between the movable and fixed cores 39 and 38 as well as a space between the closed end of the guide cylinder 53 and movable core 39 are respectively closed closely, then the pressures of the respective spaces are increased and decreased as the movable core 39 is reciprocated, which interferes with the smooth reciprocating motion of the movable core 39. To avoid this, on the outer surface of the movable core 39, there is formed a communication groove 61 which extends over the whole length of the movable core 39 in the axial direction thereof to connect together the above-mentioned two spaces. Also, on one end face of the rod 55 that faces the suction liquid chamber 50, there is formed a groove 62 which extends along one diameter line of the rod 55, on the other end face of the rod 55 that faces the movable core 39, there is formed a groove 63 which extends along one diameter line of the rod 55, and, in the rod 55, there is coaxially formed a communication hole 64 which connects together the two grooves 62 and 63. That is, the suction liquid chamber 50 communicates through the groove 62 and communication core 64 with the space between the movable and fixed cores 39 and 38, while the space between the movable and fixed cores 39 and 38 communicates through the communication groove 61 with the space between the closed end of the guide cylinder 53 and movable core 39.

Figure 3:
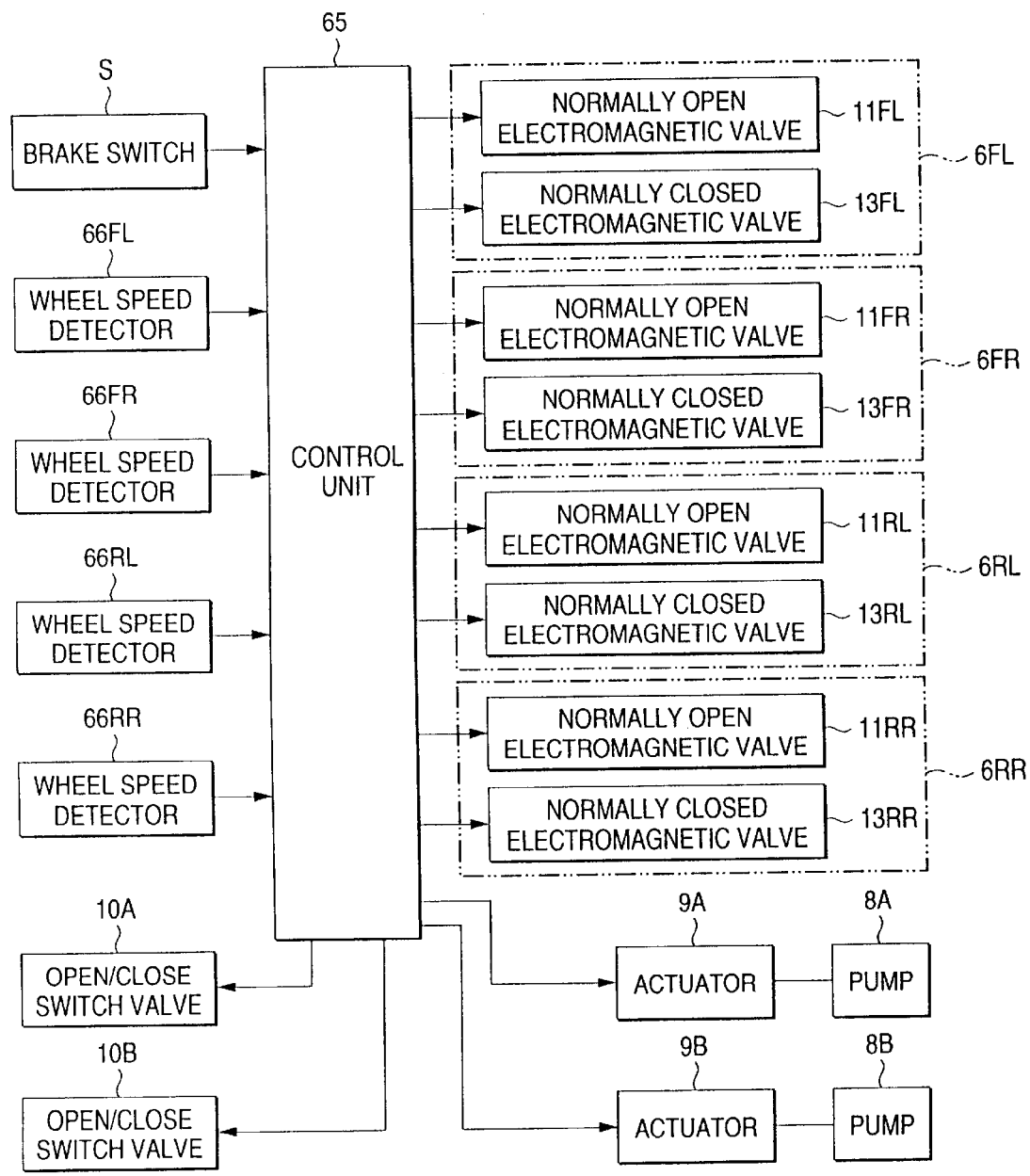
FIG. 3 is a block diagram of a control system for control valve means and pumps used in the first embodiment.

Now, in FIG. 3, the normally open electromagnetic valves $11_{FL}$, $11_{FR}$, $11_{RL}$, $11_{RR}$ and normally closed electromagnetic valves $13_{FL}$, $13_{FR}$, $13_{RL}$, $131_{RR}$ of the respective control valve means $6_{FL}$, $6_{FR}$, $6_{RL}$, $6_{RR}$, open/close switch valves 10A and 10B, and actuators 9A and 9B for actuating their associated pumps 8A and 8B are respectively controlled by a control unit 65. The control unit 65 is able to execute the following control operations not only in accordance with the detect values of the wheel speed detectors $66_{FL}$, $66_{FR}$, $66_{RL}$, $66_{RR}$ which are respectively used to detect the wheel speeds of the left and right front wheels as well as the left and right rear wheels individually, but also in accordance with the detect values of the brake switch S used to detect the operation of the brake pedal 3: that is, under the brake operation condition, an ABS operation to control the brake hydraulic pressures of the respective wheel brakes $B_{FL}$, $B_{FR}$, $B_{RL}$, $B_{FR}$; under the non-brake operation condition, a traction control operation and a behavior stabilizing control operation during the take-a-turn operation of the vehicle which respectively control the brake pressures of the drive wheels $B_{FL}$, $B_{FR}$; and, under the brake operation condition, a behavior stabilizing control operation during the take-a-turn operation of the vehicle.

Next, description will be given below of the operation of the present embodiment. In a normal brake operation to be executed by the stepping of the brake pedal 3, in the respective control valve means $6_{FL}$, $6_{FR}$, $6_{RR}$, the normally open electromagnetic valves $11_{FL}$, $11_{FR}$, $11_{RL}$, $11_{RR}$ are respectively deenergized and opened, and the normally closed electromagnetic valves $13_{FL}$, $13_{FR}$, $13_{RL}$, $131_{RR}$ are respectively deenergized and closed. Then, the hydraulic pressure output from the master cylinder M acts on the left and right drive wheel brakes $B_{FL}$, $B_{FR}$ and, at the same time, it is decreased by the proportional reduction valves $1_L$ and $1_R$ and is then applied to the left and right driven wheels $B_{RL}$, $B_{RR}$. During this operation, the open/close switch valves 10A and 10B are respectively closed, and thus the two actuators 9A and 9B for actuating the two pumps 8A and 8B respectively remain stopped.

During the above brake operation, if any one of the wheels is likely to be locked, with the open/close switch valves 10A and 10B remaining closed, the pressure reduction, pressure retention and pressure increase of the brake hydraulic pressure are switched over to each other by the control valve means that corresponds to the wheel likely to be locked, that is, the ABS control operation is executed. Here, description will be given below of the ABS control operation to be executed on the left drive wheel brake $B_{FL}$ when the left front wheel is likely to be locked, with reference to FIGS. 4 to 6.

Figure 4:
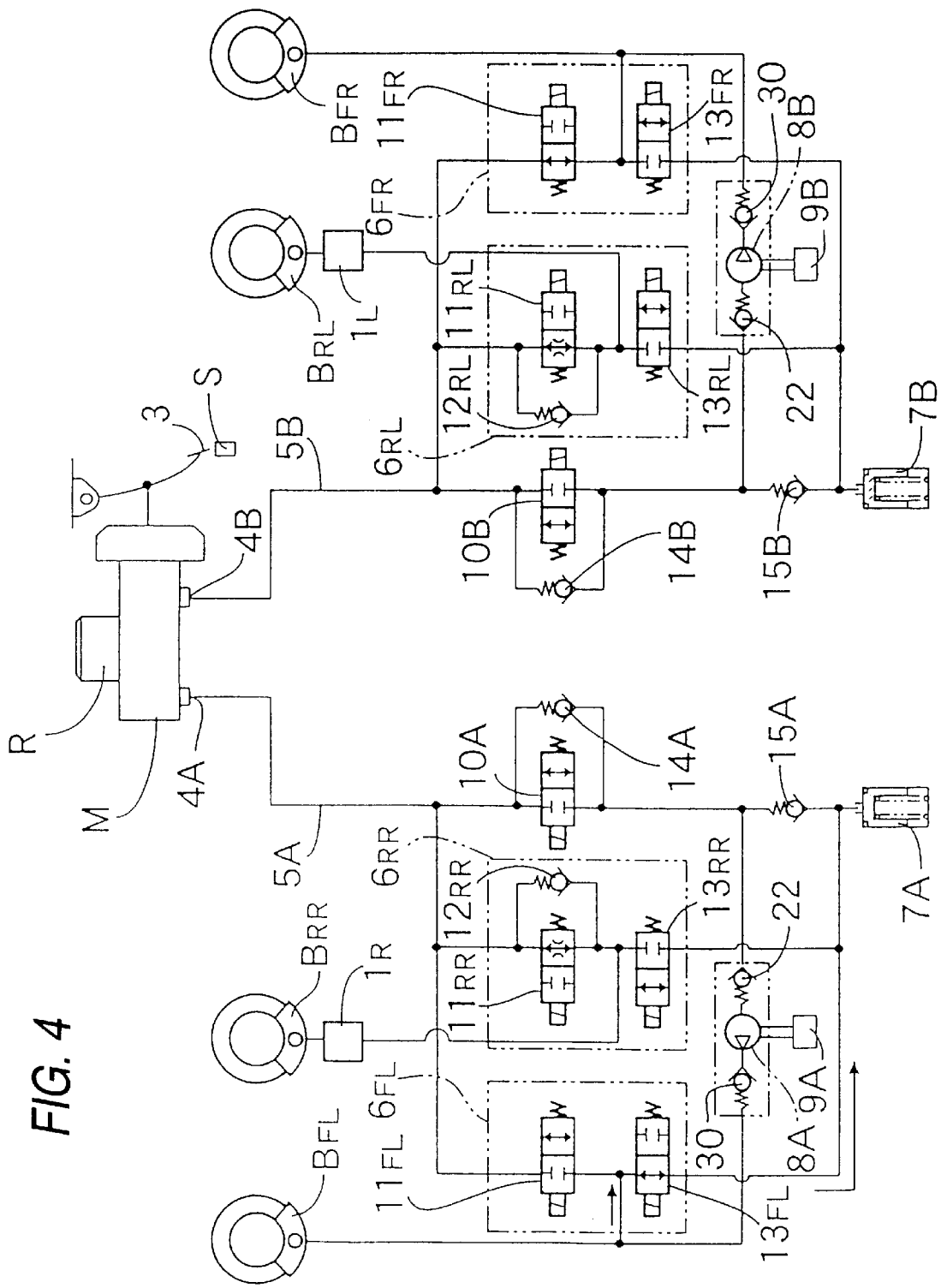
FIG. 4 is a hydraulic circuit diagram corresponding to FIG. 1, showing a pressure reduction state thereof in ABS control.

In the ABS control operation to be executed when the left front wheel is likely to be locked, at first, the pressure reduction control of the left drive wheel brake $B_{FL}$ is conducted. In the present pressure reduction control, as shown in FIG. 4, the normally open electromagnetic valve 11, of the drive wheel control valve means $6_{FL}$ is energized and closed and the normally closed electromagnetic valve $13_{FL}$ of the drive wheel control valve means $6_{FL}$ is energized and opened, thereby not only being able to cut off communication between the master cylinder M and left drive wheel brake $B_{FL}$ but also allowing communication between the left drive wheel brake $B_{FL}$ and second reservoir 7A. As a result of this, the brake fluid of the left drive wheel brake $B_{FL}$ is caused to escape to the second reservoir 7A to thereby reduce the brake hydraulic pressure of the left drive wheel brake $B_{FL}$. During this control operation, the actuator 9A for driving the pump 8A remains stopped.

Figure 5:
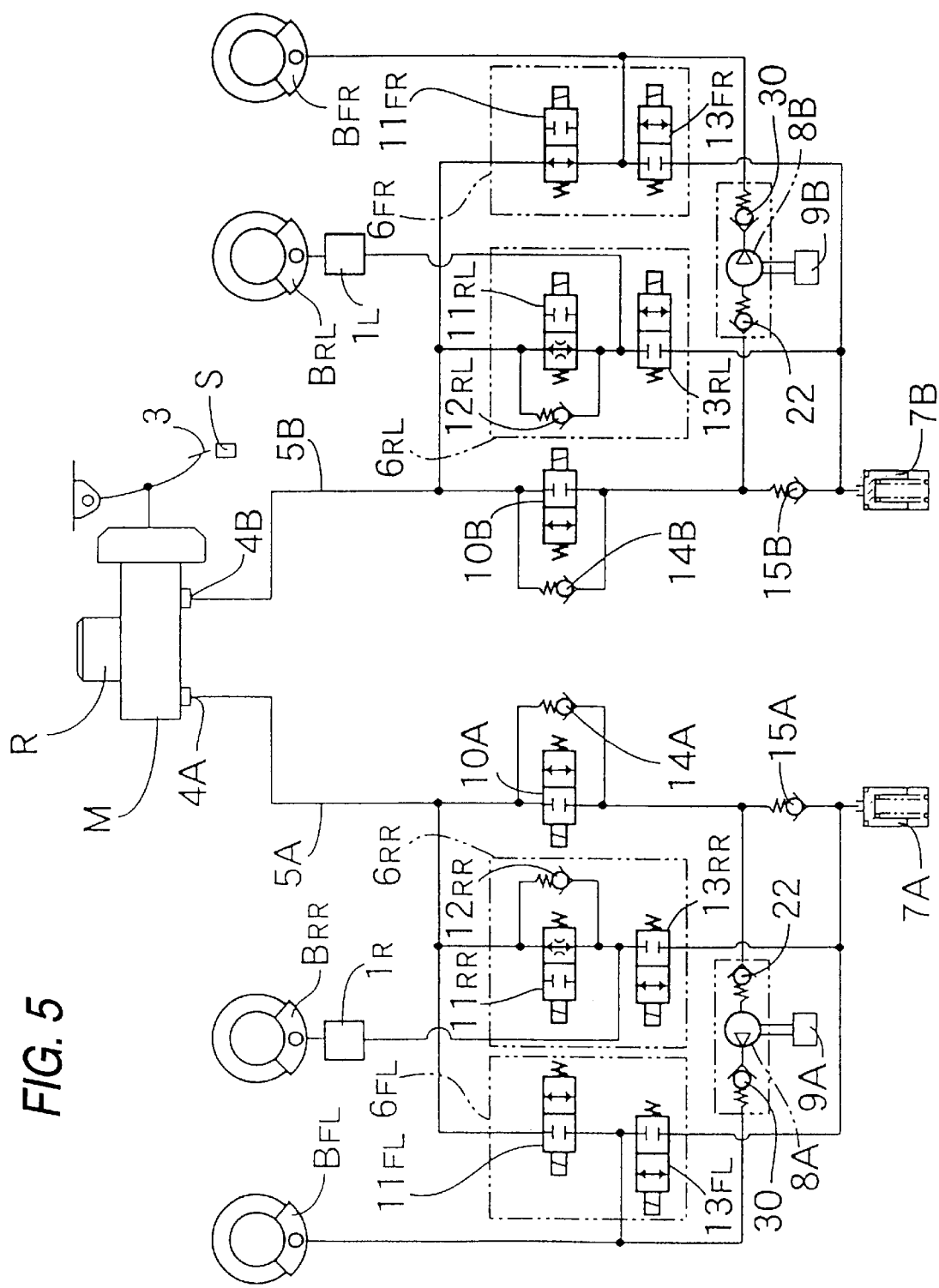
FIG. 5 is a hydraulic circuit diagram corresponding to FIG. 1, showing a pressure retention state thereof in the ABS control.

After completion of the above-mentioned pressure reduction control, there is conducted the brake hydraulic pressure retention control. That is, in the brake hydraulic pressure retention control, as shown in FIG. 5, the normally open electromagnetic valve 11, of the drive wheel control valve means $6_{FL}$ is energized and closed and the normally closed electromagnetic valve $13_{FL}$ of the drive wheel control valve means $6_{FL}$ is deenergized and closed, thereby being able to cut off communication not only between the master cylinder M and left drive wheel brake $B_{FL}$ but also between the left drive wheel brake $B_{FL}$ and second reservoir 7A. As a result of this, the brake hydraulic pressure of the left drive wheel brake $B_{FL}$ is retained as it is and, during this control operation as well, the actuator 9A for driving the pump 8A remains stopped.

Figure 6:
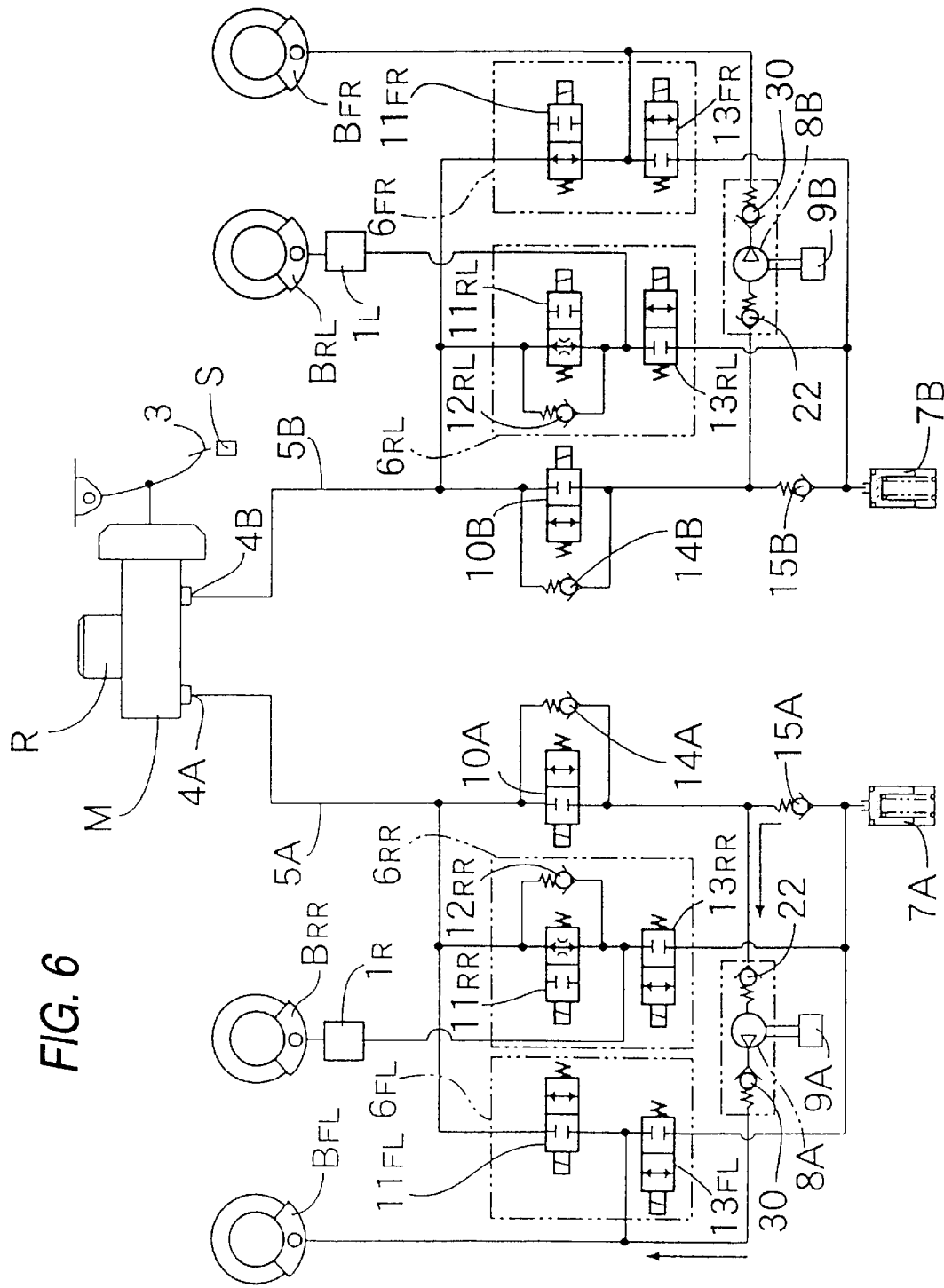
FIG. 6 is a hydraulic circuit diagram corresponding to FIG. 1, showing a pressure increase state thereof in the ABS control.

After completion of the above-mentioned hydraulic retention control, there is conducted the brake pressure increase control. In the brake pressure increase control, as shown in FIG. 6, the normally open electromagnetic valve $11_{FL}$ of the drive wheel control valve means $6_{FL}$ is energized and closed and the normally closed electromagnetic valve $13_{FL}$ of the drive wheel control valve means $6_{FL}$ is deenergized and closed, thereby being able to cut off communication not only between the master cylinder M and left drive wheel brake $B_{FL}$ but also between the left drive wheel brake $B_{FL}$ and second reservoir 7A. In the cut-off condition, the pump 8A is actuated by the actuator 9A. As a result of this, the brake fluid is drawn from the second reservoir 7A by the pump 8A and the brake hydraulic pressure due to the thus drawn liquid is applied to the wheel brake $B_{FL}$ for the left front wheel, thereby being able to increase the brake hydraulic pressure of the wheel brake $B_{FL}$ for the left front wheel.

Also, when the brake pressure is increased quickly under the condition that the vehicle running road surface shows a low friction coefficient, the normally open electromagnetic valve $11_{FL}$ of the drive wheel control valve means $6_{FL}$ may be deenergized and opened and the normally closed electromagnetic valve $13_{FL}$ of the drive wheel control valve means $6_{FL}$ may be deenergized and closed, thereby not only allowing communication between the master cylinder M and left drive wheel brake $B_{FL}$ but also being able to cut off communication between the left drive wheel brake $B_{FL}$ and second reservoir 7A. Thus, the brake pressure from the master cylinder M can be applied onto the left drive wheel brake $B_{FL}$. In this case, if the discharge pressure of the pump 8A is set lower than the output hydraulic pressure of the master cylinder M, then there can be avoided a fear that the discharge pressure can act on the master cylinder M side.

Further, when the brake pressure is increased in the ABS control under the condition that the vehicle running road surface shows a high friction coefficient, with the operation of the actuator 9A stopped, that is, the operation of the pump 8A stopped, similarly to the normal brake operation shown in FIG. 1, the normally open electromagnetic valve $11_{FL}$ of the drive wheel control valve means $6_{FL}$, may be deenergized and opened and the normally closed electromagnetic valve $13_{FL}$ of the drive wheel control valve means $6_{FL}$ may be deenergized and closed. Thus, the hydraulic pressure output from the master cylinder M is allowed to act on the left drive wheel brake $B_{FL}$ to thereby increase the brake pressure of the left drive wheel brake $B_{FL}$.

Referring now to the ABS control of the right drive wheel brake $B_{FR}$, similarly to the ABS control of the above-mentioned left drive wheel brake $B_{FL}$, the driven wheel control valve means $6_{FR}$ is controlled, while the actuator 9B for driving the pump 8B can be actuated only when increasing the brake hydraulic pressure of the right drive wheel brake $B_{FR}$.

As described above, in the ABS control of the left drive wheel brake $B_{FL}$ and right drive wheel brake $B_{FR}$, the pressure reduction, pressure retention and pressure increase of the respective drive wheel brakes $B_{FL}$ and $B_{FR}$ are repeated so that the brake fluid within the second reservoirs 7A and 7B is drawn up by the pumps 8A and 8B. This prevents the two second reservoirs 7A and 7B from being filled with the brake fluid, so that the ABS control can be conducted continuously for a long period of time.

Also, since there is no need for the two pumps 8A and 8B to discharge the hydraulic pressure that overcomes the output hydraulic pressure of the master cylinder M, the two pumps 8A and 8B can be reduced in size and weight as well as the actuators 9A and 9B for driving the pumps 8A and 8B can be reduced in size and weight.

Further, the two pumps 8A and 8B may be operated only when increasing the brake hydraulic pressures of the left drive wheel brake $B_{FL}$ and right drive wheel brake $B_{FR}$, which makes it possible not only to reduce the ABS operation noise but also to reduce the power consumption.

Now, referring to the pressure reduction and retention control in the ABS control of the right driven wheel brake $B_{RR}$ and left driven wheel brake $B_{RL}$, similarly to the above-mentioned pressure reduction and retention control of the left and right drive wheel brakes $B_{FL}$ and $B_{FR}$, the driven wheel control valve means $6_{RR}$ and $6_{RL}$ are controlled respectively. However, in the pressure increase control in the ABS control of the right driven wheel brake $B_{RR}$ and left driven wheel brake $B_{RL}$, not only the normally open electromagnetic valves $11_{RR}$ and $11_{RL}$ of the driven wheel control valve means $6_{RR}$ and $6_{RL}$ are deenergized and opened but also the normally closed electromagnetic valves $13_{RR}$ and $13_{RL}$ of the driven wheel control valve means $6_{RR}$ and $6_{RL}$ are deenergized and closed. That is, in the right driven wheel brake $B_{RR}$ and left driven wheel brake $B_{RL}$ while they are being tightened by the orifices of the normally open electromagnetic valves $11_{RR}$ and $11_{RL}$, the pressures of the right driven wheel brake $B_{RR}$ and left driven wheel brake $B_{RL}$ are increased by the output hydraulic pressure of the master cylinder M. Therefore, the right driven wheel brake $B_{RR}$ and left driven wheel brake $B_{RL}$ are used only when the discharge pressures of the two pumps 8A and 8B are used to increase the pressures of the left and right drive wheel brakes $B_{FL}$ and $B_{FR}$, so that the two pumps 8A and 8B as well as the two actuators 9A and 9B can be reduced further in size and weight.

Further, the two pumps 8A and 8B can be operated independently of each other, the operation and stop of the two pumps 8A and 8B can be controlled individually according to the brake fluid control conditions of the left and right drive wheel brakes $B_{FL}$ and $B_{FR}$ that respectively correspond to the two pumps 8A and 8B, and the drive times of the two pumps 8A and 8B can be made different from each other. This makes it possible not only to conduct the brake pressure control more accurately but also to save the energy consumption and reduce the pump operation noise.

Still further, the left and right drive wheel brakes $B_{FL}$ and $B_{FR}$ respectively consume a larger quantity of liquid than the right driven wheel brake $B_{RR}$ and left driven wheel brake $B_{RL}$ and thus, if the brake hydraulic pressures of the left and right drive wheel brakes $B_{FL}$ and $B_{FR}$ consuming a larger quantity of liquid are increased by the discharge pressures of the two pumps 8A and 8B, then the efficiency of the ABS control can be enhanced.

In addition, since the discharge ports 18, - - - of the two pumps 8A and 8B are connected respectively between the left, right drive wheel brakes $B_{FL}$, $B_{FR}$ and the drive wheel control valve means $6_{FL}$, $6_{FR}$ that respectively correspond to the left, right drive wheel brakes $B_{FL}$, $B_{FR}$, under the non-brake operation condition, that is, while the brake pedal 3 is not operated, it is possible to conduct such traction control in which the drive forces of the left and right front wheels can be reduced.

Figure 7:
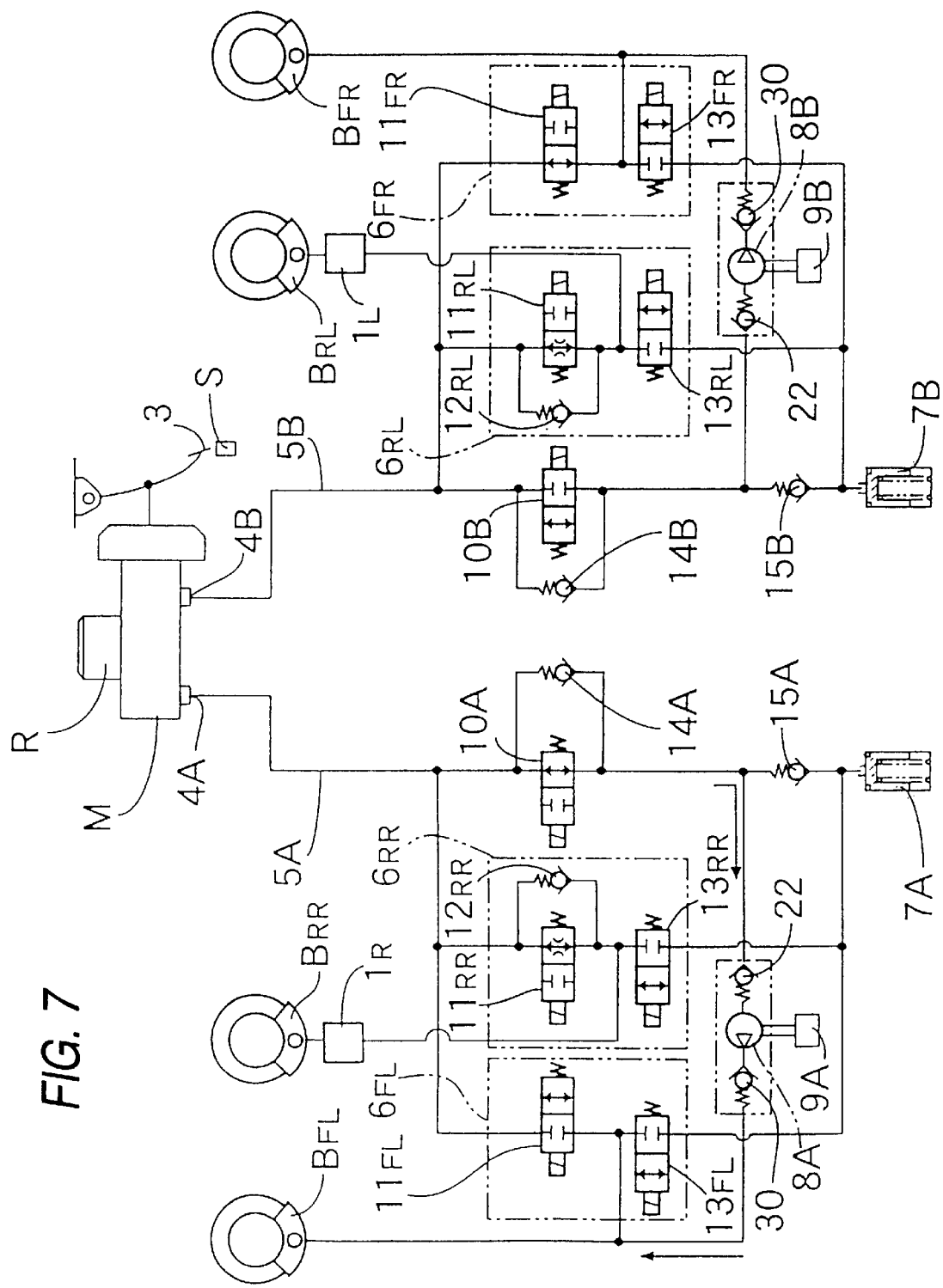
FIG. 7 is a hydraulic circuit diagram corresponding to FIG. 1, showing a traction control state thereof; and, FIG. 8 is a circuit diagram of a hydraulic circuit employed in a brake hydraulic control device for use in a vehicle according to a second embodiment of the invention.

That is, when conducting the traction control to reduce the drive force of the left front wheel, as shown in FIG. 7, the normally open electromagnetic valve $11_{FL}$ of the drive wheel control valve means $6_{FL}$ is energized and closed, the normally closed electromagnetic valve $13_{FL}$ of the drive wheel control valve means $6_{FL}$ is deenergized and closed, the normally open electromagnetic valve $11_{RR}$ of the driven wheel control valve means $6_{RR}$ is deenergized and opened, the normally closed electromagnetic valve $13_{RR}$ of the driven wheel control valve means $6_{RR}$ is deenergized and closed, and the open/close switch valve 10 is opened; and, in this state, the pump 8A is actuated by the actuator 9A. Here, as the current condition is the non-brake operation condition, the brake hydraulic pressure given by the brake fluid drawn from the master cylinder M is applied to the left drive wheel brake $B_{FL}$ to thereby operate the left drive wheel brake $B_{FL}$, which makes it possible to conduct the traction control in which the drive force of the left drive wheel can be reduced.

In this traction control, by controlling or switching communication and cut-off between the left drive wheel brake $B_{FL}$ and second reservoir 7A by the drive wheel control valve means $6_{FL}$, the brake hydraulic pressure of the left drive wheel brake $B_{FL}$ can be controlled. And, the brake fluid discharged from the left drive wheel brake $B_{FL}$ is stored in the second reservoir 7A but the brake fluid within the second reservoir 7A is also drawn by the pump 8A, to thereby avoid a fear that the second reservoir 7A can be filled up with the brake fluid.

Also, when conducting the behavior stabilization control in the vehicle take-a-turn operation under the non-brake operation condition, similarly to the above-mentioned traction control, the normally open electromagnetic valve $11_{FL}$ of the drive wheel control valve means $6_{FL}$ is energized and closed, the normally closed electromagnetic valve $13_{FL}$ of the drive wheel control valve means $6_{FL}$ is deenergized and closed, the normally open electromagnetic valve $11_{RR}$ of the driven wheel control valve means $6_{RR}$ is deenergized and opened, the normally closed electromagnetic valve $13_{RR}$ of the driven wheel control valve means $6_{RR}$ is deenergized and closed, and the open/close switch valve 10 is opened; and, in this state, if the pump 8A is actuated by the actuator 9A, then the behavior stabilization control by means of the brake pressure control of the left drive wheel brake $B_{FL}$ can be conducted.

In this manner, there is eliminated the need for provision of special means which can be used specially to conduct the traction control and behavior stabilization control. That is, simply by changing the manner of control of the pumps 8A, 8B as well as the control of the drive wheel and driven wheel control valve means $6_{FL}$, $6_{RR}$ from the ABS control, the traction control and behavior stabilization control can be executed.

Also, in the execution of the traction control and behavior stabilization control, the driven wheel control valve means $6_{RR}$ allows communication between the right driven wheel brake $B_{RR}$ and master cylinder M as well as cuts off communication between the right driven wheel brake $B_{RR}$ and second reservoir 7A. Therefore, if the brake operation is executed during execution of the traction control and behavior stabilization control, then the output hydraulic pressure of the master cylinder M involved with the brake operation can be applied immediately onto the right driven wheel brake $B_{RR}$. Accordingly, when terminating the traction control and behavior stabilization control in accordance with the detection of the brake operation by the brake switch S, even if it takes some time to terminate such control completely, the brake force can be obtained by the right driven wheel brake $B_{RR}$ to thereby be able avoid the delayed action or effect of the brake at the time of termination of the control, so that a braking operation corresponding to the intention of a driver can be realized.

In the right drive wheel brake $B_{FR}$ that is the brake for the other drive wheel, similarly to the above-mentioned left drive wheel brake $B_{FL}$, by controlling the drive wheel and driven wheel control valve means $6_{FR}$ and $6_{RL}$, there can be executed such traction control that the drive force of the right front wheel can be reduced, and such behavior stabilization control that the brake pressure of the right front wheel can be controlled.

In this manner, not only the ABS control, traction control and behavior stabilization control in the vehicle-take-a-turn operation are possible, but also, during execution of the traction control and behavior stabilization control in the vehicle-take-a-turn operation, the delayed action or effect of the brake at the time of termination of the control caused by execution of the brake operation can be prevented. And, as a structure which can realize the above operations, the open/close switch valves 10A and 10B may be simply interposed between the suction ports 20 of the pumps 8A, 8B and master cylinder M. Therefore, the number of parts required is small and the hydraulic circuit is simple in configuration.

Also, between the connecting portions of the drive wheel control valve means $6_{FL}$, $6_{FR}$ with the second reservoirs 7A, 7B and the open/close switch valves 10A, 10B, there are interposed the second check valves 15A, 15B which respectively allow the flow of the brake fluid from the above connecting portions to the open/close switch valves 10A, 10B side. Thanks to this, when executing the behavior stabilization control in the vehicle take-a-turn operation under the brake operation condition, the second check valves 15A, 15B are able to prevent the brake hydraulic pressure of the master cylinder M from being applied between the second reservoirs 7A, 7B and drive wheel control valve means $6_{FL}$, $6_{FR}$. This makes it possible to conduct the behavior stabilization control in which the brake hydraulic pressures of the drive wheel brakes $B_{FL}$, $B_{FR}$ can be controlled by the drive wheel control valve means $6_{FL}$, $6_{FR}$.

Further, referring to the structure of the two pumps 8A and 8B, the plungers 17, - - - with one end thereof facing the pump chambers 19, - - - are slidably fitted with the pump housings 16, - - -. And, the two actuators 9A and 9B, which are so arranged as to operate in a reciprocating manner, are coaxially connected with the plungers 17, - - -. This can simplify the connecting structures for connecting together the two pumps 8A, 8B and two actuators 9A, 9B, thereby being able to enhance the operation efficiency of the pumps 8A, 8B and actuators 9A, 9B.

In addition, the actuators 9A, 9B are respectively solenoids that are composed of the fixed cores 38, - - -, and movable cores 39, - - - which are coaxially connected with the plungers 17, - - - in such a manner that they are able to approach and move away with respect to the fixed cores 38, - - -. That is, the actuators 9A, 9B can be simplified in structure, so that the costs thereof can be reduced.

Figure 8:
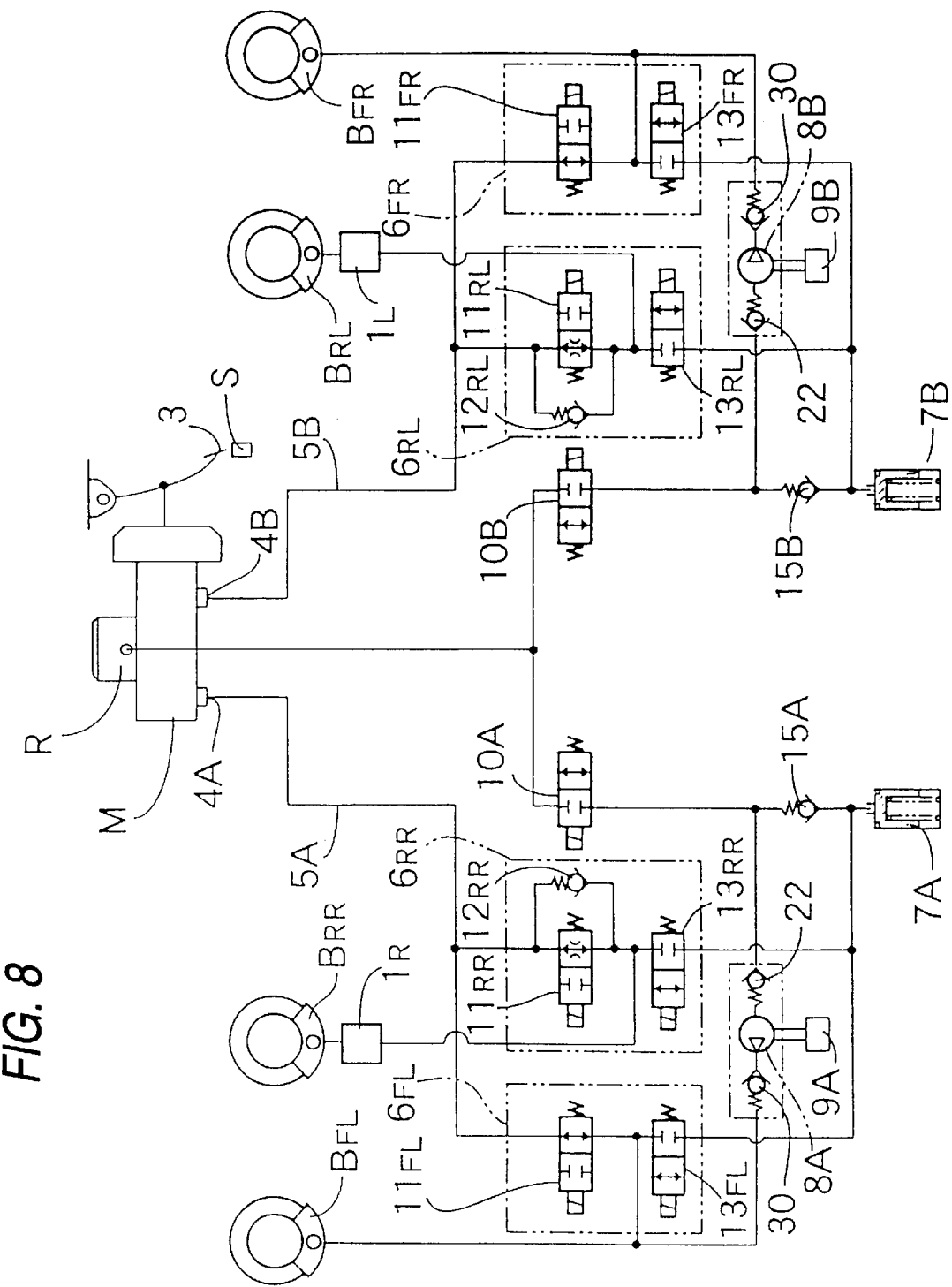

Now, FIG. 8 shows a second embodiment of a brake hydraulic control device for use in a vehicle according to the invention. In the second embodiment, parts thereof corresponding to those of the previously described first embodiment of the invention are given the same designations.

The suction ports 20 of the pumps 8A and 8B, the discharge ports 18 of which are connected between the drive wheel control valve means $6_{FL}$, $6_{FR}$ and drive wheel brakes $B_{FL}$, $B_{FR}$, are respectively connected to the first reservoir R through the open/close switch valves 10A and 10B as well as to the second reservoirs 7A and 7B through the second check valves 15A and 15B.

Also, in the first embodiment, there are connected the check valves 14A and 14B which are arranged in parallel to the open/close switch valves 10A and 10B. However, in the second embodiment, in order to avoid a fear that the brake fluid of the second reservoirs 7A and 7B can flow to the first reservoir R to thereby increase the stroke of the brake pedal 3, the check valves 14A and 14B cannot be provided.

The second embodiment is different from the first embodiment in that, when conducting the traction control and behavior stabilization control in the vehicle take-a-turn operation under the non-brake operation condition, the brake hydraulic pressure given by the brake fluid drawn from the first reservoir R by opening the open/close switch valves 10A and 10B is applied to the drive wheel brakes $B_{FL}$, $B_{FR}$. According to the second embodiment, not only there can be obtained similar operations and effects to the first embodiment, but also the following effects can be obtained.

That is, even if the open/close switch valves 10A and 10B are opened under the brake operation condition, there is no fear that the brake hydraulic pressure of the master cylinder M can be applied between the second reservoirs 7A, 7B and drive wheel control valve means $6_{FL}$, $6_{FR}$. Thanks to this, the behavior stabilization control in the vehicle take-a-turn operation under the brake operation condition can be executed immediately. In addition to this, since the hydraulic pressure within the master cylinder M can never be varied even if the open/close switch valves 10A and 10B are opened, the opening of the open/close switch valves 10A and 10B has no ill effects on the brake operation feeling.

In the illustrated embodiments, although solenoids are used as the actuators 9A and 9B, in view of the fact that the actuators 9A and 9B can be formed small in size, stepping motors, linear motors, or piezoelectric elements can also be used as the actuators.

Although the preferred embodiments of the invention have been described heretofore in detail, the present invention is not limited to these embodiments but various design changes are also possible without departing from the spirit and scope of the patent claims set forth herein.

As has been described heretofore, according to the invention, the pumps and actuators can be reduced in size and weight, and the ABS control can be conducted while reducing the ABS operation noises and the power consumption. Also, simply by changing the manner of control of the pumps and driven and drive wheel control valve means from the manner of control of them in the ABS control, the drive forces of the drive wheels can be controlled to thereby conduct the traction control and the behavior stabilization control in the vehicle take-a-turn operation. Accordingly, when the brake operation is executed during execution of the traction control and behavior stabilization control in the vehicle take-a-turn operation, the delayed brake action or effect at the time of termination of the control can be prevented to thereby realize such braking operation that corresponds to the intention of the driver. In this manner, according to the present invention, not only the ABS control, traction control, and behavior stabilization control in the vehicle take-a-turn operation are possible, but also the delayed brake effect at the time of termination of the control, which could otherwise occur when the brake operation is executed during execution of the traction control and behavior stabilization control in the vehicle take-a-turn operation, can be prevented. As a structure for realizing this, the open/close switch valves are simply interposed between the suction ports of the pumps and master cylinder. This makes it possible to reduce the number of parts required as well as simplify the configuration of the hydraulic circuit.

Also, the behavior stabilization control in the vehicle take-a-turn operation under the brake operation condition can be executed immediately, which in turn can prevent the opening of the switch valves from having ill effects on the brake operation feeling.

Further, under the brake operation condition, the behavior stabilization control through control of the brake hydraulic pressures of the drive wheel brakes using the drive wheel control valve means can be conducted in such a manner that the check valves prevent the brake hydraulic pressure of the master cylinder from being applied between the second reservoirs and drive wheel control valve means.

The present disclosure relates to the subject matter contained in Japanese patent application No. Hei. 10-217007 filed on Jul. 31, 1998 which is expressly incorporated herein by reference in its entirety.

What is claimed is:

1. A brake hydraulic control device for use in a vehicle, comprising:
 a master cylinder with a first reservoir attached thereto;
 a second reservoir different from said first reservoir;
 drive wheel control valve means switching communication and cut-off between a drive wheel brake and said master cylinder as well as communication and cut-off between said drive wheel brake and said second reservoir;
 driven wheel control valve means switching communication and cut-off between a driven wheel brake and said master cylinder as well as communication and cut-off between said driven wheel brake and said second reservoir;
 a pump having a discharge port connected between said drive wheel control valve means and said drive wheel brake, and a suction port connected to said master cylinder through an open/close switch valve and to said second reservoir;
 parallel pipes for operational fluid to flow (i) from said master cylinder to said drive wheel brake and (ii) said master cylinder through said pump to said drive wheel brake; and
 a pipe for operation fluid to flow from said master cylinder to said driven wheel brake but bypassing the pump.

2. A brake hydraulic control device for use in a vehicle according to claim 1, further comprising:
 a check valve interposed between a connecting portion, where said drive wheel brake and said second reservoir are connected together, and said open/close switch valve, for using to allow the flow of brake fluid from said connecting portion to the side of said open/close switch valve.

3. A brake hydraulic control device for use in a vehicle, comprising:
 a master cylinder with a first reservoir attached thereto;
 a second reservoir different from said first reservoir;
 drive wheel control valve means switching communication and cut-off between a drive wheel brake and said master cylinder as well as communication and cut-off between said drive wheel brake and said second reservoir;
 driven wheel control valve means switching communication and cut-off between a driven wheel brake and said master cylinder as well as communication and cut-off between said driven wheel brake and said second reservoir; and
 a pump having a discharge port connected between said drive wheel control valve means and said drive wheel brake, and a suction port connected to said master cylinder through an open/close switch valve and to said second reservoir,
 wherein said drive wheel control valve means comprises:
 a first normally open electromagnetic valve switching communication and cut-off between said drive wheel brake and said master cylinder; and
 a first normally closed electromagnetic valve switching communication and cut-off between said drive wheel brake and said second reservoir, and
 said driven wheel control valve means comprises:
 a second normally open electromagnetic valve having an orifice and switching communication and cut-off between said driven wheel brake and said master cylinder;
 a one-way valve connected in parallel to said second normally open electromagnetic valve; and
 a second normally closed electromagnetic valve switching communication and cut-off between said driven wheel brake and said second reservoir.

4. A brake hydraulic control device for use in a vehicle according to claim 1, further comprising:
 a check valve connected in parallel to said open/close switch valve,
 wherein said suction port of said pump is connected to said master cylinder through said open/close switch valve and said check valve.

5. A brake hydraulic control device for use in a vehicle according to claim 1, further comprising:
 an actuator coaxially connected to a plunger of said pump, for actuating said pump.

6. A brake hydraulic control device for use in a vehicle, comprising:
 a master cylinder with a first reservoir attached thereto;
 a second reservoir different from said first reservoir;
 a drive wheel control valve means switching communication and cut-off between a drive wheel brake and said master cylinder as well as communication and cut-off between said drive wheel brake and said second reservoir;
 a driven wheel control valve means switching communication and cut-off between a driven wheel brake and said master cylinder as well as communication and cut-off between said driven wheel brake and said second reservoir;
 a pump having a discharge port connected between said drive wheel control valve means and said drive wheel brake and a suction port connected to said first reservoir through open/close switch valve and to said second reservoir;

parallel pipes for operational fluid to flow (i) from said master cylinder to said drive wheel brake and (ii) said master cylinder through said pump to said drive wheel brake; and a pipe for operation fluid to flow from said master cylinder to said driven wheel brake but bypassing the pump.

7. A brake hydraulic control device for use in a vehicle according to claim 6, further comprising:

a check valve interposed between a connecting portion, where said drive wheel brake and said second reservoir are connected together, and said open/close switch valve, for using to allow the flow of brake fluid from said connecting portion to the side of said open/close switch valve.

8. A brake hydraulic control device for use in a vehicle, comprising:

a master cylinder with a first reservoir attached thereto;

a second reservoir different from said first reservoir;

a drive wheel control valve means switching communication and cut-off between a drive wheel brake and said master cylinder as well as communication and cut-off between said drive wheel brake and said second reservoir;

a driven wheel control valve means switching communication and cut-off between a driven wheel brake and said master cylinder as well as communication and cut-off between said driven wheel brake and said second reservoir; and a pump having a discharge port connected between said drive wheel control valve means and said drive wheel brake and a suction port connected to said first reservoir through open/close switch valve and to said second reservoir, wherein said drive wheel control valve means comprises:

a first normally open electromagnetic valve switching communication and cut-off between said drive wheel brake and said master cylinder; and a first normally closed electromagnetic valve switching communication and cut-off between said drive wheel brake and said second reservoir, and said driven wheel control valve means comprises:

a second normally open electromagnetic valve having an orifice and switching communication and cut-off between said driven wheel brake and said master cylinder;

a one-way valve connected in parallel to said second normally open electromagnetic valve; and a second normally closed electromagnetic valve switching communication and cut-off between said driven wheel brake and said second reservoir.

9. A brake hydraulic control device for use in a vehicle according to claim 8, further comprising:

an actuator coaxially connected to a plunger of said pump, for actuating said pump.

10. A brake hydraulic control device for use in a vehicle, comprising:

a master cylinder with a first reservoir attached thereto;

a second reservoir different from said first reservoir;

a drive wheel control valve unit switching communication and cut-off between a drive wheel brake and said master cylinder as well as communication and cut-off between said drive wheel brake and said second reservoir;

a driven wheel control valve unit switching communication and cut-off between a driven wheel brake and said master cylinder as well as communication and cut-off between said driven wheel brake and said second reservoir; and a pump having a discharge port connected between said drive wheel control valve unit and said drive wheel brake, and a suction port connected to said master cylinder through an open/close switch valve and to said second reservoir.

11. A brake hydraulic control device for use in a vehicle, comprising:

a master cylinder with a first reservoir attached thereto;

a second reservoir different from said first reservoir;

a drive wheel control valve unit switching communication and cut-off between a drive wheel brake and said master cylinder as well as communication and cut-off between said drive wheel brake and said second reservoir;

a driven wheel control valve unit switching communication and cut-off between a driven wheel brake and said master cylinder as well as communication and cut-off between said driven wheel brake and said second reservoir; and a pump having a discharge port connected between said drive wheel control valve unit and said drive wheel brake and a suction port connected to said first reservoir through open/close switch valve and to said second reservoir.

12. A brake hydraulic control device for use in a vehicle according to claim 1, wherein said drive wheel control valve means comprises:

a first normally open electromagnetic valve switching communication and cut-off between said drive wheel brake and said master cylinder; and a first normally closed electromagnetic valve switching communication and cut-off between said drive wheel brake and said second reservoir, and said driven wheel control valve means comprises:

a second normally open electromagnetic valve having an orifice and switching communication and cut-off between said driven wheel brake and said master cylinder;

a one-way valve connected in parallel to said second normally open electromagnetic valve; and a second normally closed electromagnetic valve switching communication and cut-off between said driven wheel brake and said second reservoir.

13. A brake hydraulic control device for use in a vehicle according to claim 6, wherein said drive wheel control valve means comprises:

a first normally open electromagnetic valve switching communication and cut-off between said drive wheel brake and said master cylinder; and a first normally closed electromagnetic valve switching communication and cut-off between said drive wheel brake and said second reservoir, and said driven wheel control valve means comprises:

a second normally open electromagnetic valve having an orifice and switching communication and cut-off between said driven wheel brake and said master cylinder;

a one-way valve connected in parallel to said second normally open electromagnetic valve; and a second normally closed electromagnetic valve switching communication and cut-off between said driven wheel brake and said second reservoir.

* * * * *